(12) United States Patent
Bhatia et al.

(10) Patent No.: US 10,324,965 B2
(45) Date of Patent: Jun. 18, 2019

(54) TECHNIQUES FOR SUGGESTING PATTERNS IN UNSTRUCTURED DOCUMENTS

(71) Applicant: INTERNATIONAL BUSINESS MACHINES CORPORATION, Armonk, NY (US)

(72) Inventors: Dimple Bhatia, San Jose, CA (US); Armageddon R. Brown, San Jose, CA (US); Yunyao Li, San Jose, CA (US); Margaret Zagelow, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 14/586,427

(22) Filed: Dec. 30, 2014

(65) Prior Publication Data

US 2016/0188610 A1   Jun. 30, 2016

(51) Int. Cl.
*G06F 16/33*   (2019.01)
*G06F 16/35*   (2019.01)
*G06F 17/27*   (2006.01)
*G06F 16/332*   (2019.01)

(52) U.S. Cl.
CPC ........ *G06F 16/3322* (2019.01); *G06F 16/334* (2019.01); *G06F 16/355* (2019.01); *G06F 17/277* (2013.01)

(58) Field of Classification Search
CPC ........... G06F 17/3071; G06F 17/30675; G06F 17/3064; G06F 16/3322; G06F 16/334; G06F 16/355; G06F 16/277
See application file for complete search history.

(56) References Cited

U.S. PATENT DOCUMENTS

| | | | | |
|---|---|---|---|---|
| 6,810,375 | B1* | 10/2004 | Ejerhed | ................ G06F 17/271 704/2 |
| 7,542,958 | B1* | 6/2009 | Warren | ............... G06F 17/3089 706/48 |
| 7,860,881 | B2 | 12/2010 | Haselden et al. | |
| 8,140,323 | B2 | 3/2012 | Johnson et al. | |

(Continued)

OTHER PUBLICATIONS

Bhatia et al. U.S. Appl. No. 14/837,148, filed Aug. 27, 2015, Non-Final Office Action dated May 29, 2018.

(Continued)

*Primary Examiner* — Alford W Kindred
*Assistant Examiner* — Soheila (Gina) Davanlou
(74) *Attorney, Agent, or Firm* — Michael R. Long; Diana L. Roberts

(57) ABSTRACT

A technique for suggesting patterns to search documents for information of interest includes acquiring a working set of spans for a document set that includes one or more documents. A list of one or more suggested patterns is generated by applying a pattern suggestion algorithm (PSA) to the set of spans for each document in the document set. One or more unique patterns are generated by applying a pattern consolidation algorithm (PCA) to the generated list of suggested patterns. Pattern information for each of the unique patterns is then generated. The pattern information includes a respective first count that corresponds to the number of times each of the unique patterns occurs in the document set.

12 Claims, 10 Drawing Sheets

(56) References Cited

U.S. PATENT DOCUMENTS

| | | | | |
|---|---|---|---|---|
| 2002/0184188 A1* | 12/2002 | Mandyam | ............... | G06F 8/20 |
| 2007/0179940 A1* | 8/2007 | Robinson | ............ | G06F 17/3064 |
| 2011/0093452 A1* | 4/2011 | Jain | .................. | G06F 17/3064 |
| | | | | 707/723 |
| 2012/0290292 A1 | 11/2012 | Liu et al. | | |
| 2014/0006013 A1* | 1/2014 | Markatou | ........... | G06F 17/3061 |
| | | | | 704/9 |
| 2014/0039879 A1* | 2/2014 | Berman | ............... | G06F 17/277 |
| | | | | 704/9 |
| 2015/0317476 A1* | 11/2015 | Singla | ................. | G06F 21/552 |
| | | | | 726/23 |

OTHER PUBLICATIONS

Bhatia et al. U.S. Appl. No. 14/837,148, filed Aug. 27, 2015, Final Office Action dated Dec. 26, 2018.

Bhatia et al. U.S. Appl. No. 14/837,148, filed Aug. 27, 2015, Advisory Action dated Apr. 11, 2019.

\* cited by examiner

400

*Revenues from the Software segment were $5.6 billion*, an increase of 14 percent (11 percent adjusting for currency) compared with the fourth quarter of 2005. *Revenues* for IBM's middleware brands, which include WebSphere Information Management, Tivoli, Lotus and Rational products were $4.4 billion, up 18 percent versus the fourth quarter of 2005. Operating systems *revenues* decreased 2 percent to $642 million compared with the prior-year quarter. *Revenues* from other software and services increased which includes the Product Lifecycle Management portfolio of products.

For the Global Services business, segment <u>*revenues* from Global Technology Services increased 7 percent (4 percent adjusting for currency) to $8.6 billion, and segment *revenues* from Global Business Services increased 6 percent (3 percent adjusting for currency) to $4.2 billion</u>. IBM signed services contracts totaling $17.8 billion, up 55 percent year over year and ended the full year with an estimated services backlog including Strategic Outsourcing, Business Transformation Outsourcing, Global Business Services, Integrated Technology Services and Maintenance, of $116 billion, an increase of $5 billion from the prior-year period.

<u>Global Financing segment *revenues* increased 3 percent (flat, adjusting for currency) in the fourth quarter to $620 million.</u>

The company's total gross profit margin was 44.6 percent in the 2006 fourth quarter compared with 44.1 percent in the 2005 period.

FIG. 4

TECHNIQUES FOR SUGGESTING PATTERNS IN UNSTRUCTURED DOCUMENTS

BACKGROUND

The present disclosure is generally directed to data processing and more particularly to suggesting patterns in data. Still more particularly, the present disclosure is directed to techniques for suggesting patterns in unstructured documents.

Unstructured data (unstructured information) usually refers to information that either does not have a predefined data model or is not organized in a predefined manner. Unstructured information is typically heavy on text and may include other data, e.g., dates and numbers. The wide variations in unstructured information make unstructured information difficult to interpret using traditional computer programs, as compared to data stored in field form in databases or data that is annotated (e.g., semantically tagged) in documents. It has been estimated that between eighty to ninety percent of all potentially usable business information originates in unstructured form and that unstructured information accounts for seventy to eighty percent of all organizational data.

Techniques such as data mining, natural language processing (NLP), and text analytics have been employed to locate patterns in unstructured information. A common technique for structuring text has involved manually tagging unstructured information with metadata. Unstructured Information Management Architecture (UIMA) provides a common framework for processing unstructured information to extract meaning and create structured data about the unstructured information. Software that creates machine-processable structure usually exploits linguistic structure that is inherent in all forms of human communication. Algorithms can infer inherent structure from text, for example, by examining word morphology, sentence syntax, and other small-scale patterns and large-scale patterns. Unstructured information can be tagged to address ambiguities and relevancy-based techniques may then be used to facilitate search and discovery. Examples of unstructured data include books, journals, documents, metadata, health records, audio, video, analog data, images, files, and unstructured text, e.g., the body of an email message, a Web page, or a word processing document.

BRIEF SUMMARY

Disclosed are a method, a data processing system, and a computer program product (embodied in a computer-readable storage device) for suggesting patterns in documents (e.g., unstructured documents).

A technique for suggesting patterns to search documents for information of interest includes acquiring a working set of spans for a document set that includes one or more documents. A list of suggested patterns is generated by applying a pattern suggestion algorithm (PSA) to the set of spans for each document in the document set. Unique patterns are generated by applying a pattern consolidation algorithm (PCA) to the generated list of suggested patterns. Pattern information for each of the unique patterns is then generated. The pattern information may include a respective first count that corresponds to the number of times each of the unique patterns occurs in the document set and/or a pattern uniqueness.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 4 depicts a relevant portion of an example of an unstructured document that includes data in various patterns;

DETAILED DESCRIPTION

Figure 1:
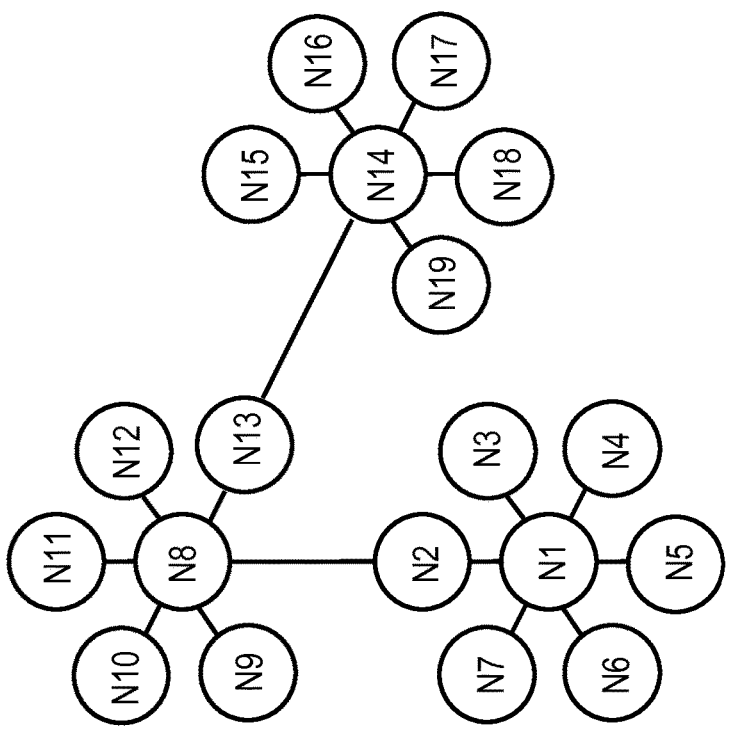
FIG. 1 is a diagram of an exemplary high performance computing (HPC) cluster that includes a number of nodes, with one or more of the nodes including multiple processors that are configured to suggest patterns in unstructured documents, according to various aspects of the present disclosure.

The illustrative embodiments provide a method, a data processing system, and a computer program product (embodied in a computer-readable storage device) for suggesting patterns in documents (e.g., unstructured documents).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the term 'token' is a categorized block of text or 'lexeme'. As used herein, a 'literal' is a notation for representing a fixed value in source code and is a type of 'token'.

To facilitate extracting structured information from unstructured information, users may create patterns using, for example, dictionaries, and/or regular expressions, and/or tokens. However, it is difficult for a user to create patterns that extract all possible combinations of structured information from unstructured information, such as documents. For example, when attempting to extract revenue for divisions of a company from company financial documents, a user may build a first pattern that, for example, includes: a dictionary of terms indicating revenue; followed by some number of tokens/words; followed by a division dictionary (including division names); followed by some number of tokens/words; and followed by an extractor to extract an actual revenue amount. The first pattern may, for example, be applied to the text passage " . . . Revenues from the Software segment were $5.6 billion, an increase of 14 percent . . . " to extract financial information from a document that includes the text passage. However the first pattern may not extract other combinations of the same information that may exist in the document. For example, revenue for divisions of the company may follow a second pattern that includes: a division dictionary; followed by some number of words; followed by a dictionary of terms for revenue; followed by some number of tokens/words; and followed by an extractor to extract an actual revenue amount. The second pattern may, for example, be applied to the text passage " . . . Global Financing segment revenues increased 3 percent in the fourth quarter to $620 million . . . " to extract financial information from the document that includes the text passage.

According to the present disclosure, techniques that suggest additional patterns to a user (of a data processing system) that may exist in documents related to text being extracted are disclosed. While conventional solutions, such as paraphrasing, may be able to suggest alternatives to text being extracted, paraphrasing usually only applies to limited use cases (e.g., paraphrasing may only apply to grammatical text) or produces limited patterns (e.g., automatic pattern suggestion may be based on examples). According to one or more aspects of the present disclosure, patterns are suggested based on input document text being used for information extraction. In general, the disclosed techniques aid users in identifying anomalies/oddities by indicating the number of matches for a pattern in each document. For example, in a set of documents a given pattern may have matching results in twenty percent of the documents.

Advantageously, the disclosed techniques reduce the need for users to search through large unstructured documents to determine what possible patterns may be missing in extracted search results. The disclosed techniques generally provide better quality results and aid a user in identifying possible anomalies/oddities in user constructed patterns. In one or more embodiments, span analysis, which is described in further detail below, may be employed. It is also contemplated that linguistic configuration may also be utilized to discover additional patterns. In various embodiments, an information extraction engine (e.g., implemented in a pattern suggestion application) may be employed to present additional patterns.

In span-driven pattern suggestion, a 'span' is loosely defined by a pair of integers that represent character positions in an analyzed document. The integers of a particular span define a beginning and an end of a text segment in the document, and the text segment is said to 'match' a particular extractor. A first step in span-driven pattern suggestion is to acquire an initial working set of spans. One straightforward way to acquire an initial working set of spans is to execute one or more text extractors against a set of one or more documents to produce the set of spans. Each span in a set of spans maps to a single document and to a single extractor. After an initial set of spans is acquired, a second step in span-driven pattern suggestion is to select a pattern suggestion algorithm (PSA) and apply the PSA to the set of spans associated with each document. In general, a PSA receives a set of spans for a single document as an input and returns a list of suggested patterns as an output. In this case, each suggested pattern has a corresponding ordered sequence of extractors and may also include supplemental pattern objects (e.g., token gaps and literals) that are appropriate for a targeted environment. As previously mentioned, the term 'token' refers to a string of one or more characters that is significant as a group. As used herein, the term 'token gap' refers to a sequence of zero or more adjacent tokens, where the minimum and maximum number of tokens in the token gap are specified (e.g., a token gap of '0-5' between 'revenue' and 'division' means that there are between zero and five adjacent tokens that separate 'revenue' from 'division'). As used herein, the term 'literal' refers to a character string or an integer string and is a type of 'token'. In general, each suggested pattern that is produced by a PSA should be compilable as a new extractor or serve as a template to help a user (or pattern suggestion system) generate and compile a new extractor.

According to various aspects of the present disclosure, a PSA may be generally configured to: determine a beginning of a pattern; determine an end of the pattern (which may be specified by a user as a maximum pattern length); determine a minimum or maximum length of the pattern; ignore spans from a particular document and/or a particular extractor; and reject a pattern, for example, based on 'quality'. A PSA configured according to the present disclosure may also be configured to: automatically determine supplemental pattern objects (e.g., token gaps and literals); handle partially overlapping spans and completely overlapping spans; and normalize a pattern. Functionality of a PSA may be hard-coded, specified by a pattern suggestion system user, automatically determined based on previous or partial generation results, or some combination thereof.

A third step in span-driven pattern suggestion is to select and apply a pattern consolidation algorithm (PCA) to suggested patterns that were generated by a PSA. In general, a PCA receives a set of suggested patterns as an input and returns a consolidated set of unique patterns as an output. A PCA may work across patterns from all documents at once or from each document individually and then consolidate the patterns from all documents at the end. A PCA configured according to the present disclosure may generally be configured to determine pattern compatibility and consolidate multiple compatible patterns into a single pattern. A fourth step in span-driven pattern suggestion is to gather pattern information (e.g., occurrence information) for each of the unique patterns produced by a PCA. The occurrence information may, for example, include: a count of how many times each suggested pattern appeared across a full target document set; and/or a count (e.g., with corresponding document identifiers) of how many documents in the document set contained each suggested pattern. The pattern information (with appropriate tooling) allows users of a system with span-driven pattern suggestion capabilities to more easily identify anomalies or commonalities in data and to adjust extractor patterns accordingly.

According to the present disclosure, a pattern suggestion system (e.g., a data processing system that executes a pattern suggestion application) is configured to suggest patterns to retrieve information of interest from documents, e.g., unstructured documents. According to various aspects of the present disclosure, techniques for performing high performance computing (HPC), or network computing, are described herein that configure one or more nodes (which may each include one or more symmetric multiprocessors (SMPs)) to dynamically suggest patterns for searching unstructured documents for information of interest. With reference to FIG. 1, an example topology for a relevant portion of an exemplary HPC cluster (supercomputer) 100 includes a number of nodes (N1-N18) that are connected in, for example, a three-dimensional (3D) Torus topology. While eighteen nodes are illustrated in FIG. 1, it should be appreciated that more or less than eighteen nodes may be present in an HPC cluster configured according to the present disclosure.

Figure 2:
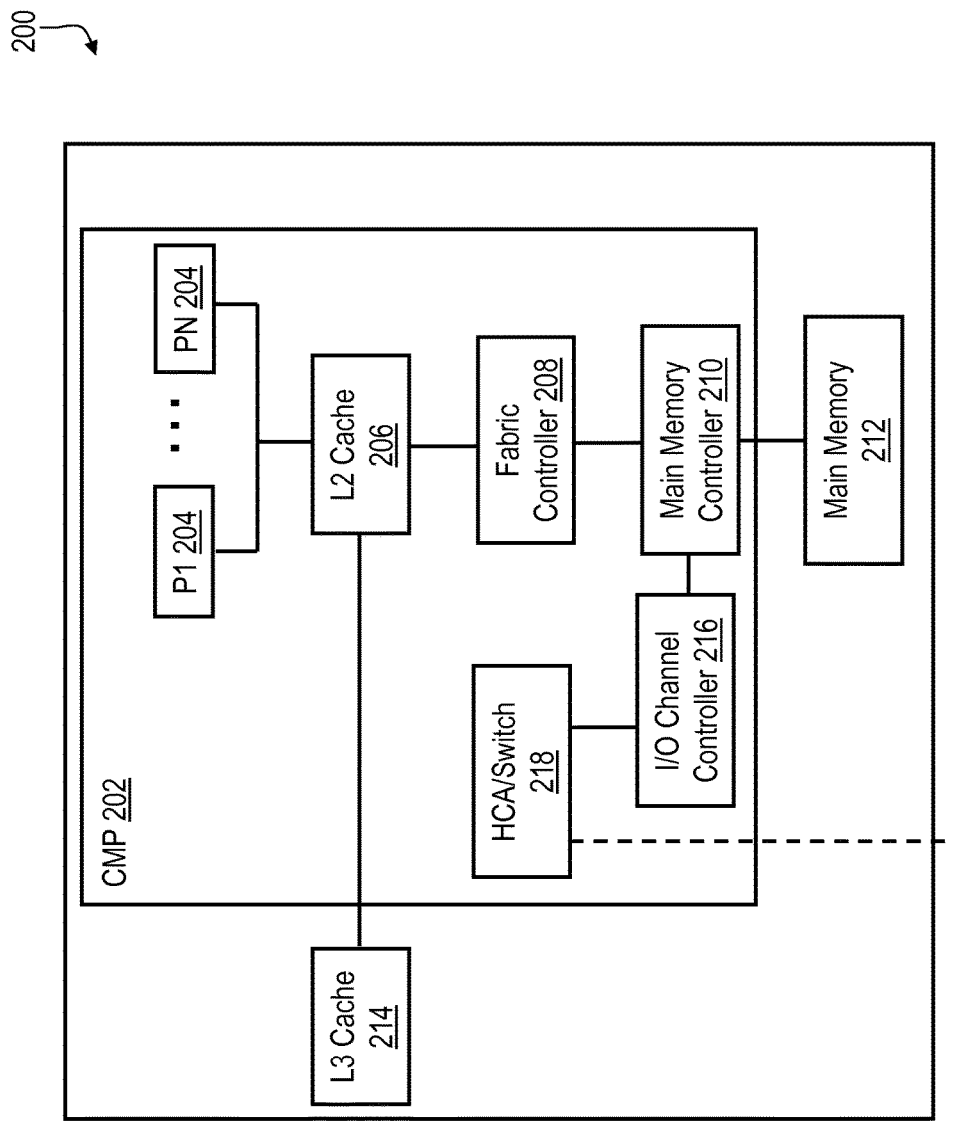
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

As used herein, the notation '[.]' refers to a pattern object that may either be a token gap ([tg]) or a literal (<lit>), depending on the text that actually comes from a particular input document. Determination of whether a pattern object is a token gap or a literal is described in conjunction with the discussion below on automatically determining (auto-determining) supplemental pattern objects. As used herein, the notation '[tg]' refers to a token gap pattern object, and the notation '<lit>' refers to a literal pattern object.

Criteria for determining the beginning of a pattern may come in the form of a user-specified or automatically calculated (auto-calculated) list of extractors. In one or more embodiments, for each extractor 'E(i)' in an extractor list, a PSA is executed using the extractor 'E(i)' as a pattern 'start key'. In this case, every occurrence of a span from extractor 'E(i)' marks the beginning of a new suggested pattern. If the list of extractors is empty, then the beginning of each document marks the beginning of another suggested pattern. If extractor 'E(i)' was the 'start key' used to begin a current pattern, criteria for determining an end of the pattern may be marked by either another occurrence of the extractor 'E(i)' or the end of a current document (or the end of the pattern may be specified by a user as a maximum pattern length). In the case of another occurrence of 'E(i)', where the end criteria is a subsequent occurrence of the extractor 'E(i)', the suggested pattern ends with the pattern object immediately preceding the subsequent occurrence of the extractor 'E(i)'. That is, the subsequent extractor 'E(i)' occurrence is not considered to be part of the current suggested pattern. In this case, the subsequent extractor 'E(i)' is the start of another suggested pattern (per the pattern begin criteria described above).

Criteria for determining the minimum and/or maximum length of a pattern may, for example, impose a hard-coded maximum on the length of each suggested pattern and a minimum pattern length of two for an edge case. According to one embodiment, a singleton pattern is retained as a suggested pattern for an edge case, which is indicated if a pattern consists of a single extractor and at least one span for the extractor includes at least two complete spans from other extractors. Example 1 illustrates the case where an extractor in a pattern does not represent a sub-pattern of its own (that includes at least two complete spans from other extractors) and, as such, is discarded.

EXAMPLE 1

Spans: B(11,30), C(11,15), D(20,25)
Start Keys: {D}
Suggested Patterns:
  (none)

In Example 1, as extractor 'D' is the start key the extractors for spans 'B' and 'C' are ignored and extractor 'D' is utilized to start building a pattern. However, as span 'D' is the last span, the result is a singleton generated pattern of span 'D'. Since span 'D' does not contain any sub-spans, criteria for a minimum pattern length of two spans is applied, and the singleton pattern is discarded.

Example 2 illustrates the case where an extractor represents a sub-pattern of its own and, as such, is retained.

EXAMPLE 2

Spans: B(11,30), C(11,15), D(20,25)
Start Keys: {B}
Suggested Patterns:
1) B

In Example 2, even though the suggested pattern 'B' is a singleton pattern, the singleton pattern is retained as the span 'B' includes spans 'C' and 'D' and, as such, the span 'B' effectively represents a sub-pattern of its own, namely, 'C [.] D'.

According to one or more contemplated embodiments, spans from a particular document and/or a particular extractor may be ignored. Spans from a particular document or set of documents may be ignored and/or a user-specified list of extractors may be implemented for specifying extractors to be ignored. In at least one embodiment, if a span from an extractor in the user-specified list is found the span is ignored while building a pattern. Ignoring an extractor span may be achieved by adding the span to a current pattern as a token gap, where the length of the gap is maxTokGap(E(i)), which is the maximum number of tokens found across all spans (and across all documents) from the extractor to be ignored. In various embodiments, a rejected pattern is not included in final set of suggested patterns provided by a PSA. It should be appreciated, however, that a rejected pattern still consumes spans, which means that a span that is part of a rejected pattern will not contribute to any other patterns generated using a start key of the rejected pattern. The span may, however, still contribute to patterns generated using a different start key.

According to one aspect of the present disclosure, two forms of user-specified criteria for rejecting generated patterns are supported that may be used together or separately. A first form of user-specified criteria for rejecting a pattern is specified as a list of required extractors. When the end-of-pattern criteria (as described above) has been met for the current pattern, a check is made to determine if the pattern includes at least one occurrence of every extractor in the user-specified list. If at least one of the specified extractors is missing from the pattern, the pattern is rejected. A second form of user-specified criteria for rejecting a pattern is a quality-based rejection criteria. In this case, the PCA defines a quality measurement and a hard-coded or user-specified quality threshold is then applied to determine if the pattern should be rejected. For example, pattern quality may be measured using a pattern extractor uniqueness ratio (PEUR) that ranges from '0' to '1'.

A PEUR for a pattern may, for example, be calculated by dividing the number of distinct extractor objects in the pattern by the total number of extractor objects in the pattern. A PEUR of '1' means that every extractor that appears in the pattern appears exactly once. When the end-of-pattern criteria (as described above) has been met for the current pattern, the PEUR for that pattern is calculated and a check is performed to determine if the PEUR is greater than or equal to a default or user-specified PEUR threshold. If the PEUR is not greater than or equal to a threshold, the pattern is rejected. It should be noted that the PEUR can never be zero. As such, a PEUR threshold of zero means that none of the generated patterns will be rejected based on quality. Example 3 illustrates a case where the PEUR is utilized to determine whether a pattern is rejected.

EXAMPLE 3

Generated Pattern: A <lit> B C D [.] B C
PEUR Threshold: 0.8
Pattern Rejected? Yes.

In Example 3, the PEUR for the generated pattern is calculated as 0.67 (i.e., 4/6), which is less than the threshold of 0.8. In this case, the pattern is rejected due to poor quality. It should be noted that literals and token gaps are not used when calculating the PEUR.

According to at least one embodiment, literals and token gaps are added to the suggested pattern based on analysis of span begin and end positions. More specifically, in one embodiment, when the end position of one span is less than the beginning position of the immediately subsequent span in the current document, the segment of text between the end position of the first span and the beginning position of the subsequent span (exclusive) becomes a 'segment of interest'. If the 'segment of interest' is empty (because the spans are adjacent), a token gap of size zero is added to the current pattern. Token gaps with a size of zero may be normalized away as part of a PCA if the token gaps are not needed. In at least one embodiment, if the number of tokens in the 'segment of interest' is less than a hard-coded threshold, the 'segment of interest' is added to the current pattern as a literal. In at least one embodiment, if the number of tokens in the 'segment of interest' is greater than or equal to the hard-coded threshold, the 'segment of interest' is added to the pattern as a token gap.

Example 4 illustrates the case where a 'segment of interest' is added to a pattern as a literal.

EXAMPLE 4

Sample Text: "Fourth-quarter income from continuing operations was $3.5 billion"
Spans: A(15,20), B(53,64)
Start Keys: {A}
Token Gap Threshold: 5
Suggested Patterns:
1) A <lit> B In Example 4, the 'segment of interest' between spans 'A' and 'B' corresponds to the text 'from continuing operations was'. Assuming basic tokenization on whitespace, the segment has four tokens, which is less than the token gap threshold of five. In this case, the suggested pattern includes a literal whose value is the text from the 'segment of interest', as four is less than the hard-coded threshold of five.

Example 5 illustrates the case where a 'segment of interest' is added to a pattern as a token gap.

EXAMPLE 5

Sample Text: "Fourth-quarter income from continuing operations was $3.5 billion"
Spans: A(15,20), B(53,64)
Start Keys: {A}
Token Gap Threshold: 3
Suggested Patterns:
1) A [tg] B In Example 5, the 'segment of interest' between spans 'A' and 'B' corresponds to the text 'from continuing operations was'. Assuming basic tokenization on whitespace, the 'segment of interest' has four tokens, which is greater than the token gap threshold of three. In this case, the suggested pattern includes a token gap whose gap size is four (as there are four tokens in the 'segment of interest') and the segment of interest is added to the suggest pattern as a token gap.

According to one or more embodiments, partially overlapping spans and completely overlapping spans are handled in different manners. In cases where a span from one extractor 'E(i)' partially overlaps with a subsequent span from extractor 'E(j)' the extractor 'E(i)' is added to the current pattern, but the extractor 'E(j)' is not added to the current pattern. That is, the span with the lesser begin position takes precedent. In one or more embodiments, the segment of text that is included in the span from 'E(j)' but not in the span from 'E(i)' is added to the pattern as a token gap following 'E(i)'.

Example 6 illustrates the case where a span from one extractor 'E(i)' partially overlaps with a subsequent span from extractor 'E(j)' and the extractor 'E(i)' is added to the current pattern, but the extractor 'E(j)' is not added to the current pattern:

EXAMPLE 6

Spans: A(5,10), B(11,30), C(25,35), D(36,40)
Start Keys: {A}
Suggested Patterns:
1) A B [tg] D In Example 6, spans 'B' and 'C' partially overlap, and span 'B' has the lesser begin position. In this case, span 'B' is included in the suggested pattern, but span 'C' is not included in the suggested pattern. The [tg] pattern element represents a token gap that is generated for the segment of text defined by the range (31,35), which corresponds to the text that is included in span 'C' but not in span 'B'.

In one or more embodiments, when the span from one extractor 'E(i)' is completely included within, but not equal to, the span from another extractor 'E(j)', only the extractor 'E(j)' is added to the current pattern. In other words, the larger span takes precedence. However, user-specified drill-down may occur during pattern generation. According to one embodiment, the criteria for drill-down is provided as a user-specified list of extractors. While building a pattern, if a span from one of the extractors in the specified list is found the extractor is not added to the current pattern. Instead, the segment of text covered by the span is broken down into a sub-pattern and all elements of the sub-pattern are added to the current pattern. If the span for extractor 'E(j)' completely includes spans for extractors 'E(i)' and 'E(k)', then 'E(i)' and 'E(k)' are added to the current pattern, in order of appearance, along with any supplemental literals or token gaps, as appropriate. If the span for 'E(j)' does not contain any sub-spans, the span for 'E(j)' remains in the pattern as 'E(j)' (i.e., no drill-down occurs).

Example 7 illustrates the case where a larger span that includes two other spans is added to a suggested pattern.

EXAMPLE 7

Spans: A(5,10), B(11,30), C(11,15), D(20,25), E(35,40)
Start Keys: {A}
Drill-Down: (none)
Suggested Patterns:
1) A B [.] E In Example 7, span 'B' completely includes spans 'C' and 'D'. Since no drill-down criteria was specified, span 'B' (i.e., the larger span) takes precedent and is added to the suggested pattern.

Example 8 illustrates the case where a larger span that includes two other spans is not added to a suggested pattern, as the larger span is specified as part of the drill-down criteria.

EXAMPLE 8

Spans: A(5,10), B(11,30), C(11,15), D(20,25), E(35,40)
Start Keys: {A}
Drill-Down: {B}
Suggested Patterns:
1) A C [.] D [.] E In Example 8, span 'B' completely contains spans 'C' and 'D'. However, span 'B' is specified as part of the drill-down criteria, so the suggested pattern does not include 'B', but instead includes the sub-pattern contained within span 'B' (i.e., 'C [.] D').

In one or more embodiments, when the span from one extractor 'E(i)' exactly equals the span from another extractor 'E(j)' two separate suggested patterns are generated. The first pattern has 'E(i)' at the position of duplication, while the second pattern has 'E(j)' at the position of duplication. Aside from the positions of duplication, all other objects in the patterns are the same. Example 9 illustrates the case where two different patterns are generated for duplicate extractors.

EXAMPLE 9

Spans: A(5,10), B(11,30), C(11,30), D(35,40)
Start Keys: {A}
Suggested Patterns:
1) A B [.] D
2) A C [.] D In Example 9, spans 'B' and 'C' are exactly the same, so instead of picking span 'B' or span 'C' two different patterns are generated. A first pattern has 'B' in the position of duplication, and a second pattern has 'C' in the position of duplication.

According to at least one embodiment, when end-of-pattern criteria is met for a current pattern, the pattern is normalized such that the normalized pattern begins and ends with an extractor element. In one or more embodiments, if the generated pattern starts or ends with a sequence of one or more token gaps or literals, the token gaps and literals at the start or end of the generated pattern are 'trimmed' from the pattern. In at least one embodiment, if the generated pattern contains adjacent literals, all of the adjacent literals are converted into a single token gap (where the size of the token gap reflects the total number of tokens found across the set of adjacent literals). In at least one embodiment, if the generated pattern contains adjacent token gaps, all of the adjacent token gaps are consolidated into a single token gap (where the size of the final gap reflects the aggregate size of all adjacent token gaps).

In one or more embodiments, if the generated pattern contains a literal that is adjacent to a token gap, the literal and the token gap are consolidated into a single token gap (where the size of the final gap reflects the size of the original token gap plus the number of tokens found in the adjacent literal). In at least one embodiment, a normalized pattern never includes multiple adjacent occurrences of the same extractor element. If the generated pattern contains adjacent occurrences of the same extractor element, the first occurrence is preserved in the normalized pattern and all remaining occurrences are consolidated into a single token gap. Assuming 'E(i)' refers to the extractor element that repeats and assuming that the number of adjacent occurrences is 'n', the minimum size of the of the final token gap is maxTokGap(E(i)) and the maximum size is (n−1)*maxTokGap(E(i)). In this case, maxTokGap(E(i)) reflects the maximum number of tokens found across all spans (and across all documents) by the extractor 'E(i)'.

Example 10 illustrates the case where repeated instances of a span are replaced with a single instance of the span followed by a token gap.

EXAMPLE 10

Generated Pattern: A B B B C
maxTokGap(B)=4
Normalized Pattern: A B [tg] C

In Example 10, the repeated instances of span 'B' are replaced with a single instance of span 'B' followed by a token gap. In this case, since the maximum number of tokens across all spans (and across all documents) from span 'B' is four, the token gap [tg] has a range of [4-8].

As used herein, the term 'compatible' as used with respect to two or more patterns means the two or more patterns can be consolidated down into a single representative pattern. For example, two more candidate patterns are 'compatible' if and only if the ordered list of extractor objects for each candidate pattern is exactly the same. It should be appreciated that the definition of 'compatible' ignores supplemental pattern objects (e.g., literals and token gaps). Example 11 illustrates one case where two patterns are not compatible.

EXAMPLE 11

Candidate Patterns:
P1) A B C
P2) A [tg] B
Compatible? No.

In Example 11, the ordered list of extractor objects for pattern 'P1' is 'A B C', and for pattern 'P2' is 'A B'. Since the lists for the patterns 'P1' and 'P2' are not equal, the patterns 'P1' and 'P2' are not compatible.

Example 12 illustrates another case where two patterns are not compatible.

EXAMPLE 12

Candidate Patterns:
P1) A B C B
P2) A B C
Compatible? No.

In Example 12, the ordered list of extractor objects for pattern 'P1' is 'A B C B' and the ordered list of extractor objects for pattern 'P2' is 'A B C'. Since the lists for the patterns 'P1' and 'P2' are not equal, the patterns 'P1' and 'P2' are not compatible. In the example, multiple occurrences of an extractor object are preserved in the ordered list that is used to determine compatibility. That is, lists, not sets are used to determine compatibility.

Example 13 illustrates the case where four patterns are compatible.

EXAMPLE 13

Candidate Patterns:
P1) A <lit> B [tg] C B
P2) A [tg] B <lit> C B
P3) A <lit> B <lit> C B
P4) A [tg] B [tg] C B
Compatible? Yes.

In Example 13, the candidate patterns 'P1', 'P2', 'P3', and 'P4' differ in the inclusion of literals and token gaps. However, the patterns 'P1', 'P2', 'P3', and 'P4' each have the same ordered list of extractor objects, namely 'A B C B' and, as such, the patterns 'P1', 'P2', 'P3', and 'P4' are compatible.

According to aspects of the present disclosure, a set of compatible patterns are consolidated by applying consolidation rules (defined below) to each position 'p' in the longest candidate pattern, starting with position '1' and iterating forward. In at least one embodiment, per consolidation rule 'A', if an object at position 'p' is an extractor E(i), the extractor E(i) is appended to a consolidated pattern. Per consolidation rule 'B', if an object at position 'p' is a literal or token gap then the full set of pattern objects that exist at the same relative position (with respect to the preceding and succeeding extractor objects) are gathered from all candidate patterns. If such a pattern object does not exist for a candidate pattern, then nothing from that pattern is added to the working set. Per consolidation rule 'B(i)', if the set only contains a single literal, the literal is added to the consolidated pattern at position 'p'. If the set only contains a single token gap and the maximum size of that token gap is greater than zero, the token gap is appended to the consolidated pattern per consolidation rule 'B(i)'. Per consolidation rule 'B(ii)', if the set contains more than one item, consolidation rules 'B(ii)(a)', 'B(ii)(b)', and 'B(ii)(c)' are applied. Per consolidation rule 'B(ii)(a)', the minimum and maximum number of tokens allowed across all token gaps in the set are found. It should be appreciated that the minimum and maximum values may come from two different token gaps. Per consolidation rule 'B(ii)(b)', the minimum and maximum number of tokens contained across all literals in the set are found. Per consolidation rule 'B(ii)(c)', a new token gap is added to the consolidated pattern. In this case, the minimum number of tokens for the gap is the lesser of the minimum values found in consolidation rule 'B(ii)(a)' and consolidation rule 'B(ii)(b)' and the maximum number of tokens for the gap is the greater of the maximum values found in consolidation rule 'B(ii)(a)' and consolidation rule 'B(ii)(b)'.

Example 14 illustrates the application of the various consolidation rules set forth above.

EXAMPLE 14

Compatible Patterns:
P1) A <'denied tcp'> B [1-5] C B
P2) A <'denied tcp'> B [3-10] C B
Consolidated Pattern:
A <'denied tcp'> B [1-10] C B In Example 14, the pattern objects at position 1, 3, 5, and 6 are extractor objects (assuming counting starts at position 1) and per consolidation rule 'A' all extractor objects are added to the consolidated pattern as they are encountered. It should be appreciated that there are two positions where consolidation happens (i.e., position 2 and position 4). For position 2, the working set of pattern objects contains a single literal value, i.e., "denied tcp". Per consolidation rule 'B(i)' the literal is added directly to the consolidated pattern at position 2. For position 4, the working set of pattern objects contains two different token gaps (i.e., {[1-5], [3-10]}). The minimum number of tokens across that set is '1' and the maximum number of tokens across that set is '10'. Per consolidation rule 'B(ii)', the consolidated pattern has a new token gap [1-10] added at position 4.

Example 15 further illustrates the application of the various consolidation rules set forth above.

EXAMPLE 15

Compatible Patterns:
P1) A <'denied tcp'> B [1-10] C [0-0] B
P2) A [5-15] B [1-10] C B
P3) A [5-10] B [0-0] C [0-0] B
Consolidated Pattern:
A [2-15] B [0-10] C B In Example, 15, pattern 'P1' has more objects than pattern 'P2' and, as such, consolidation is performed using pattern positions as defined by pattern 'P1'. Pattern 'P3' may be used for consolidation, as pattern 'P3' has the same length as pattern 'P1'. The pattern objects at positions 1, 3, 5, and 7 are extractor objects (assuming counting starts at position 1). Per consolidation rule 'A' the extractor objects are all added to the consolidated pattern as they are encountered. In this case, there are three positions where consolidation occurs (i.e., position 2, position 4, and position 6). For position 2, the working set of pattern objects includes a literal and two token gaps (i.e., {"denied tcp", [5-15], [5-10]}). The minimum number of tokens allowed by token gaps in the set is '5' and the minimum number of tokens contained by literals in that set is '2' (assuming basic whitespace tokenization). The maximum number of tokens allowed by token gaps in the set is '15' and the maximum number of tokens contained by literals in that set is '2'.

Per consolidation rule B(ii), the consolidated pattern has a new token gap [2-15] that is added at position 2. For position 4, the working set of pattern objects includes two token gaps (i.e., {[1-10], [0-0]}). The minimum number of tokens across the set is '0' and the maximum number of tokens across the set is '10'. Per consolidation rule 'B(ii)', the consolidated pattern has a new token gap of [0-10] added at position 4. In this case, the empty token gap (i.e., [0-0]) is used when determining minimum and maximum token counts. For position 6, the pattern 'P2' does not have a pattern object at the same relative position (between span 'C' and 'B') so nothing from the pattern 'P2' is added to the working set. In this case, the working set of pattern objects includes a single token gap (i.e., [0-0]). Per consolidation rule 'B(i), since the maximum size of the token gap is not greater than zero nothing is added to the consolidated pattern for position 6 of pattern 'P1'.

In one or more embodiments, pattern suggestions are provided to a user of a pattern suggestion system to help the user create an extractor that extracts division revenue amounts from a set of quarterly reports. For example, a user of the system may initially upload a set of sample documents that each represents a quarterly report. The user may then search an extractor catalog provided by the system and find that there is already a "money" extractor in the catalog. In this example, the catalog, however, does not contain anything for finding division names. In this case, the user may create a new dictionary called 'division', where each term in the new division dictionary is the name of a division. The user may then scan the first of the sample documents to locate a pattern that represents what the user is searching for, namely "Revenues from the Software segment were $5.6 billion, an increase of . . . " In this case, the user already has a division dictionary to extract the division name 'Software segment' and a 'money' extractor to extract the dollar amount '$5.6 billion'. The only other keyword the user wants to search for in the pattern is the word 'Revenues', which could appear in singular or plural form. In this case, the user may create a second dictionary called "revenue" and add the terms 'revenue' and 'revenues' to the second dictionary.

Figure 3:
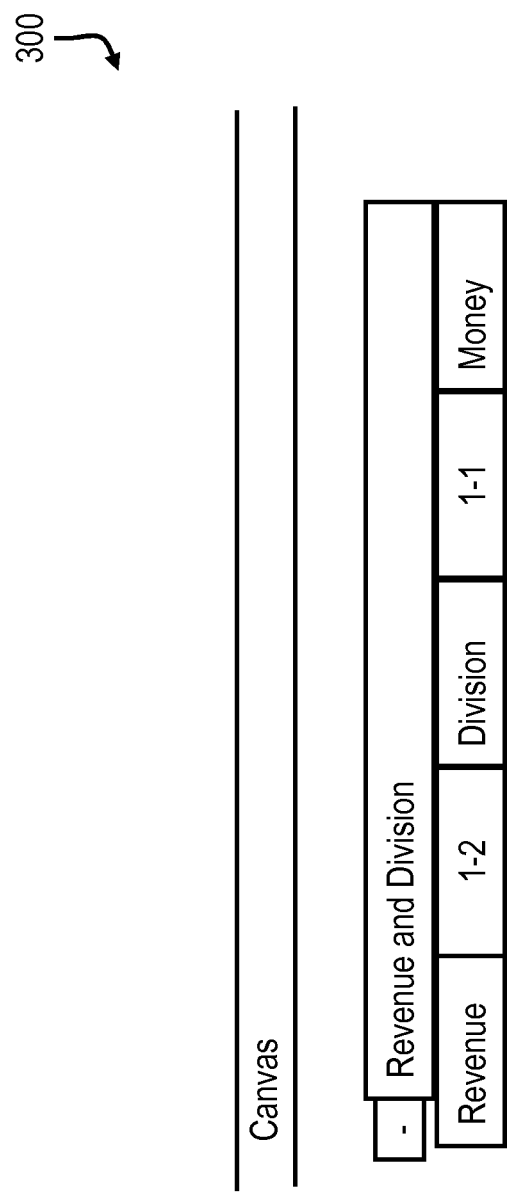
FIG. 3 depicts an exemplary canvas for displaying extractors for unstructured documents.

According to the example, the user may then connect the 'money', 'division', and 'revenue' objects together on a canvas provided by a pattern suggestion application, for example, providing the objects in an order that matches the example text the user located (i.e., "Revenues from the Software segment were $5.6 billion, an increase of . . . "). The user may also add token gaps to deal with the words like 'from', 'the', and 'were', which the user does not really care about. At this point a visual representation of the pattern may take the form of screenshot 300 of FIG. 3. In this example, the user may then execute the sequence and examine the results, highlighted by a pattern suggestion application, in a first of the sample documents. For example, a sample document may take the form of screenshot 400 of FIG. 4.

From the perspective of the user, the good news is that the user's pattern correctly extracted the text that the user was trying to extract (italicized with bolding). However, the bad news is that the initial sequence failed to locate other occurrences of text (underlined) that also report revenue earnings for divisions in the dictionary. The first and second misses were not located because the user's token gaps (i.e., the user used token gaps of '[1-2]' and '[1-1]') were too specific. That is, the token gaps did not cover the intermediate words for the 'Global Technology Services' and 'Global Business Services' matches. The third miss was not located because the order of the blocks is different. That is, instead of 'Revenue [.] Division [.] Money', the match is 'Division Revenue [.] Money'. At this point, if the disclosed techniques are not employed, the user is required to manually scan through all of the text in all of the sample documents to try and determine a proper token gap size and other differently-ordered patterns that are required to extract desired data from the documents. Depending on the number of documents and the length of the sequence the user is trying to extract, the determination process may be time consuming and error-prone. However, by employing the disclosed span-driven pattern suggestion techniques user time and effort to extract desired data from documents may be reduced.

As describe above, the disclosed techniques are initiated by acquiring an initial set of spans. In the example, the user may effectively execute four different extractors ("Revenue and Division", "Revenue", "Division", and "Money") against a set of documents to produce a set of spans that serves as an input. In FIG. 4, every piece of marked text corresponds to a single span that was extracted when the user executed the "Revenue and Division" extractor. As mentioned above, the acquired set of spans are then fed into a PSA that generates a set of normalized sequences. For example the following default criteria may be employed for the initial execution of the PSA:

Start Keys: {Revenue, Division, Money}
Ignored Extractor: (none)
Drill-down Extractors: (none)
Required Extractors: (none)
PEUR Treshold: 0.80

The list of required extractors is used to reject patterns that do not include certain extractor objects. Normalized sequences are then passed to a PCA, which produces a consolidated set of suggested unique patterns. Finally, information about how often each suggested pattern actually appears in a sample document set is gathered and the information, along with the suggested patterns, are returned by the application, which presents the suggested patterns, along with relevant occurrence information, to the user. One relatively simple way to display the information is illustrated in screenshot 500 of FIG. 5.

Figure 5:
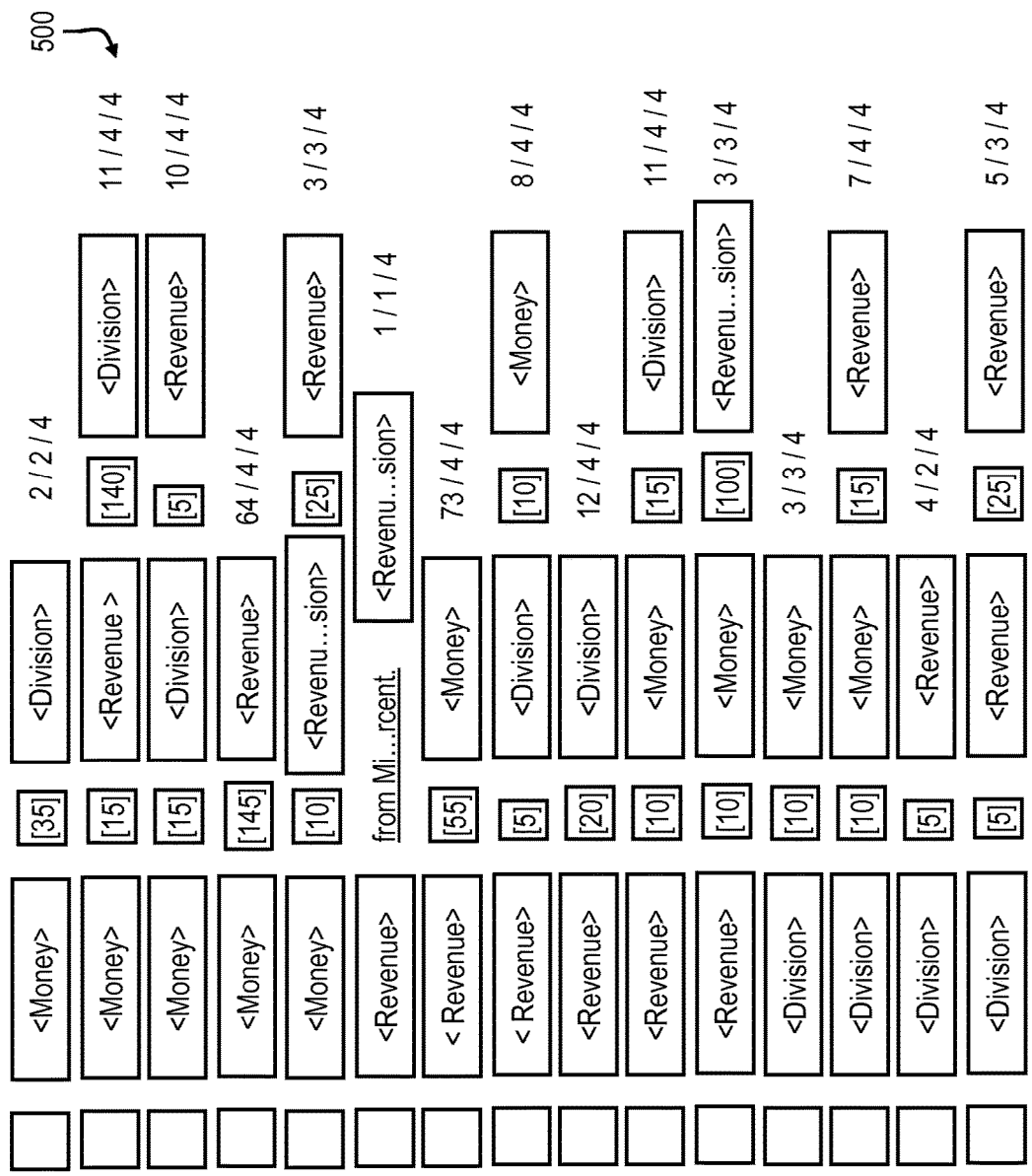
FIG. 5 depicts a number of different suggested patterns for extracting data from unstructured documents.

In FIG. 5, the numbers 'X/Y/Z' at the end of each pattern represent the following: 'X' is the total number of occurrences across all sample documents; 'Y' is the total number of documents that included at least one occurrence; and 'Z' is the total number of sample documents. For example, from the results in FIG. 5, the pattern 'Revenue [.] Money [.] Division' appeared eleven times in total and appeared at least once in all of the four sample documents. In one or more embodiments, the application uses the reported values to help a user explore suggested pattern matches in more detail. The application may, for example, be configured to support the following operations: when a user selects on one of the 'X' values, the user is presented with a succinct (e.g., tabular) view of the matches for the corresponding suggested pattern; and when a user selects on one of the 'Y' values, the user can choose to view either the documents that contained at least one match of the corresponding suggested pattern or the documents that did not contain any matches of the corresponding suggested pattern.

Figure 6:
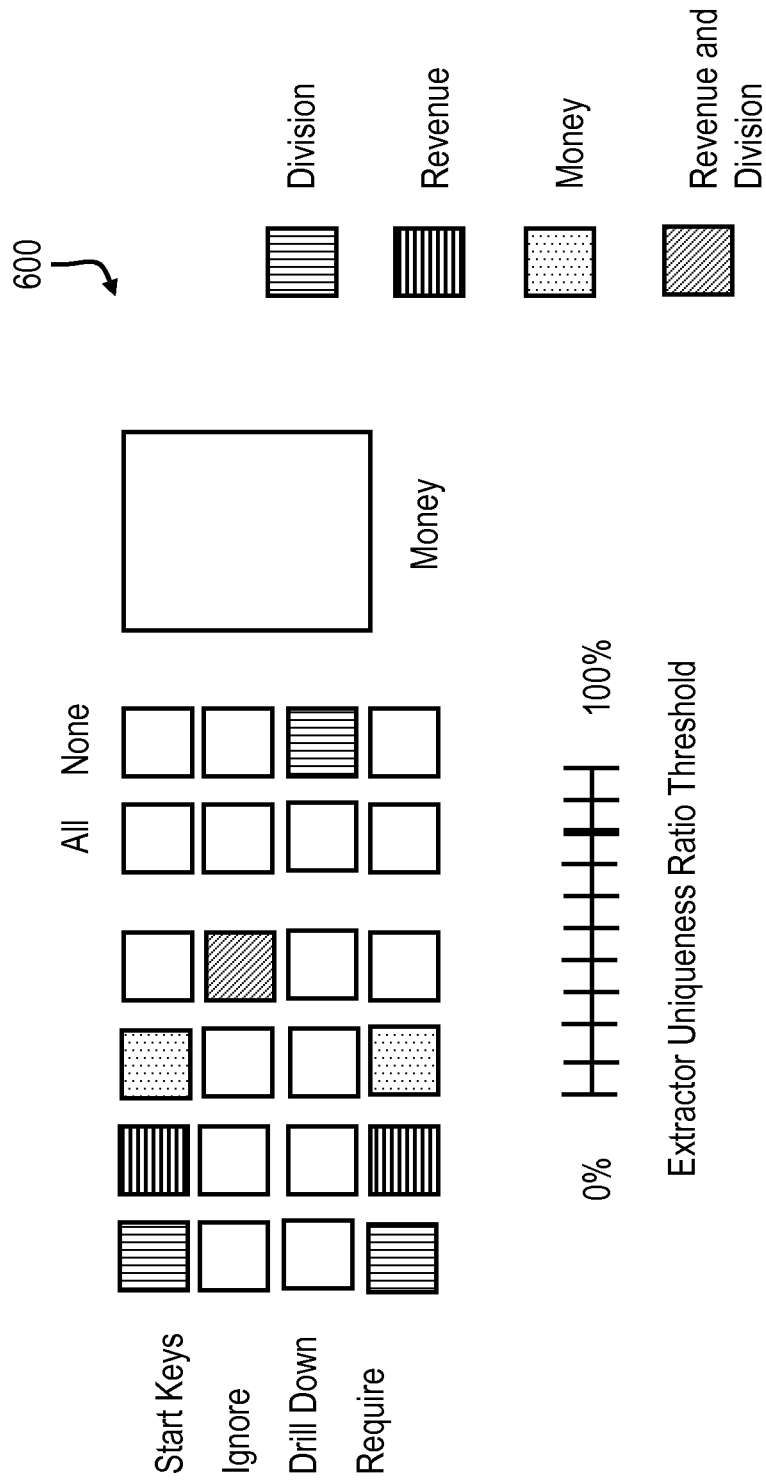
FIG. 6 depicts a relevant portion of an exemplary user interface (UI) for providing require and ignore criteria to an application that suggests patterns for extracting data from unstructured documents.
Figure 7:
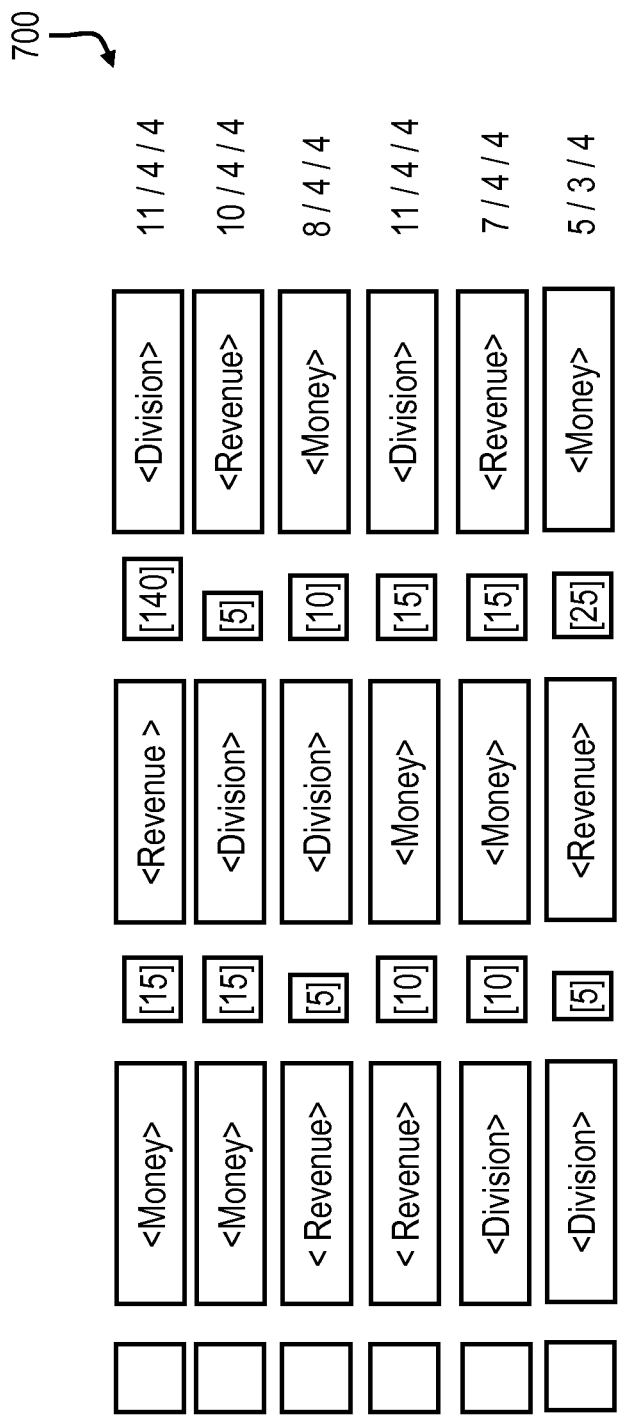
FIG. 7 depicts an updated number of different suggested patterns for extracting data from unstructured documents taken from the suggested patterns illustrated in FIG. 5, according to an embodiment of the present disclosure.

In the illustrated example, the default criteria results in a total of fifteen different suggested patterns, which may initially be somewhat overwhelming to a user. However, it should be appreciated that the user only cares about patterns that contain all three of 'Revenue', 'Division', and 'Money' and does not care about sequences that have 'Revenue and Division', because 'Revenue and Division' represents the top-level pattern the user is trying to build and is not expected to be part of a larger pattern. In this case, the user can provide 'Require' and 'Ignore' criteria to the application, using user interface (UI) features provided by the application, to reduce the suggested patterns. An example UI 600 is illustrated in FIG. 6. In UI 600, each column of the grid corresponds to an extractor. The right-most two columns allow for easy selection of "All" or "None", respectively. As the user updates the criteria, the application re-executes the PSA and may return a reduced set of suggested patterns 700 that are illustrated in FIG. 7.

Figure 8:
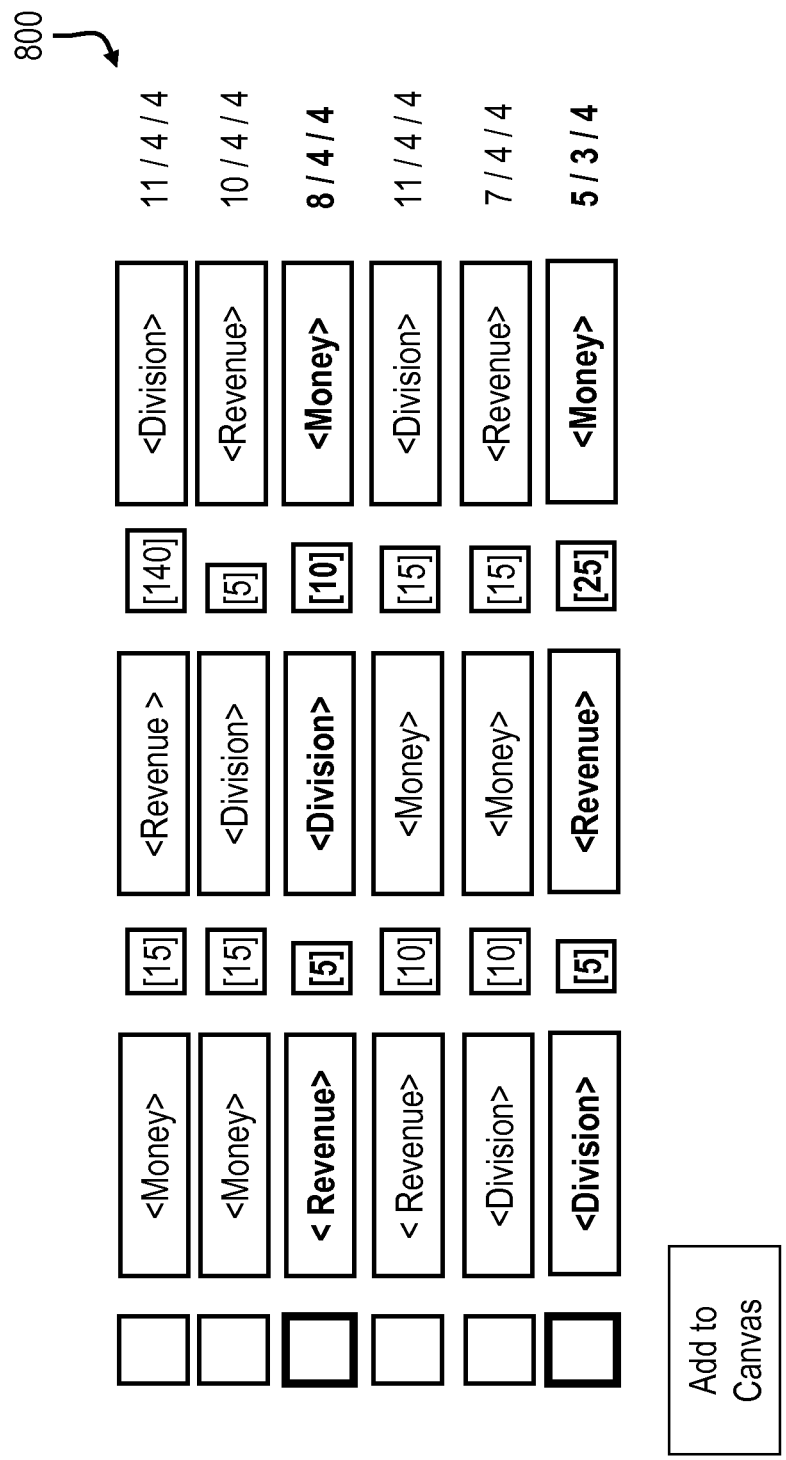
FIG. 8 depicts a relevant portion of an exemplary application screenshot in which a user has selected two of the suggested patterns illustrated in FIG. 7 to be added to a canvas associated with the user, according to an embodiment of the present disclosure.
Figure 9:
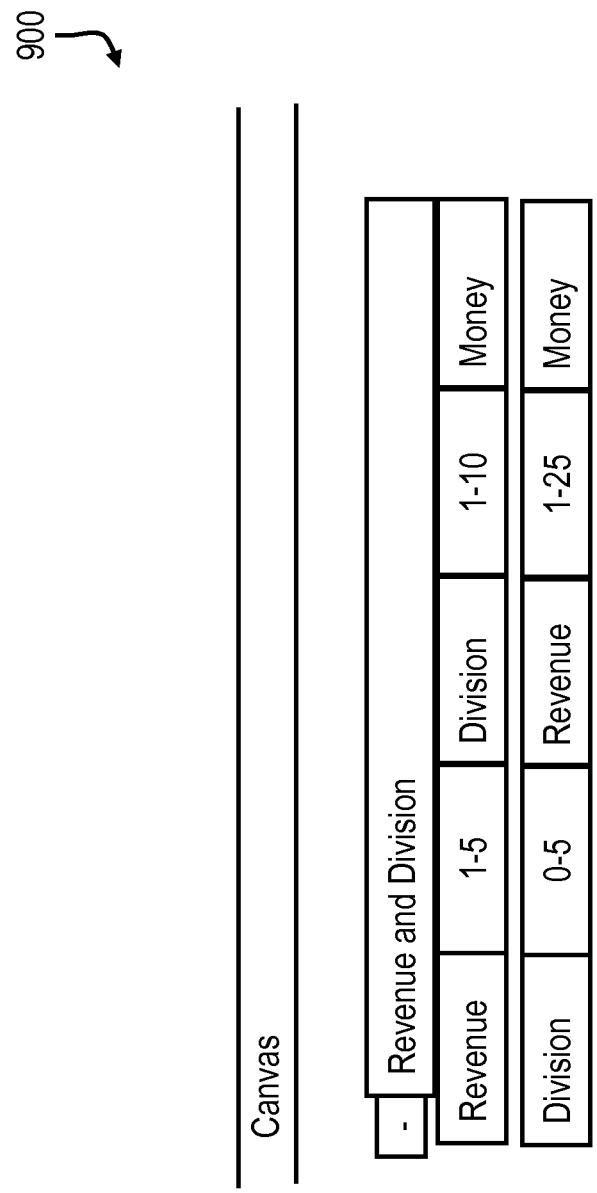
FIG. 9 depicts an exemplary application screenshot of a revenue and division extractor that is based on the suggested patterns selected by the user in association with FIG. 8, according to an embodiment of the present disclosure.

At this point, any of the above suggested patterns could potentially correspond to the 'revenue by division' text that the user wants to extract. In this case, the user still has additional work to perform. However, the additional work is reduced as the user now only has to check the suggested patterns, instead of manually searching the documents to find all of the possible patterns in the data. To continue with the example, the user may select the occurrence counts for each suggested pattern to see the matches in a succinct form and determine whether a given pattern is relevant. With reference to screenshot 800 of FIG. 8, after examining the matches for each pattern, the user may notice that the third suggested pattern covers the initial rule, but has a larger token gap that also covers two of the three matches that were missing from the initial rule. The user may further notice that the sixth suggested pattern covers the third match that the user was missing and also covers four other matches that the user did not even realize were missing from the initial rule (because of the ordering of the sequence). Finally, the user may also determine that the other suggested patterns are not relevant to the user because the other suggested patterns extract revenue, division, and money values that are not all related to each other. Having determined which suggested patterns the user needs the user selects those patterns from the list and adds them to the working canvas. The user may then delete the original rule from the canvas, leaving the user with a final extractor 900 illustrated in FIG. 9. According to the present disclosure, the user has successfully created a 'Revenue by Division' extractor that includes rules the application was able to suggest to the user, based on the execution results from an original (incomplete) pattern.

Figure 10:
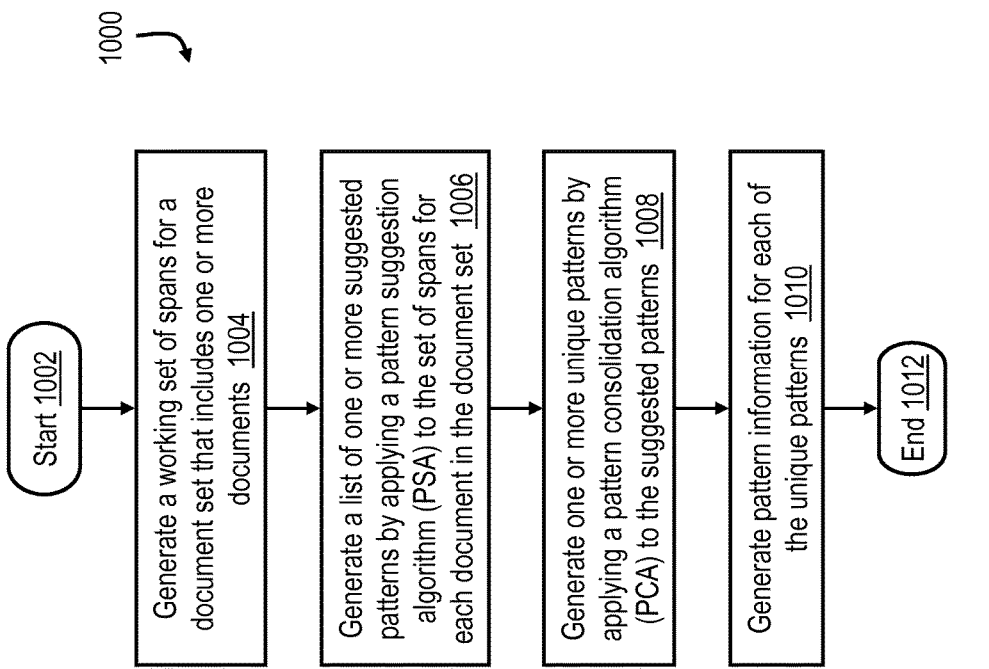
FIG. 10 is a flowchart of an exemplary process for suggesting patterns in unstructured documents, according to an embodiment of the present disclosure.

With reference to FIG. 10 a process 1000 for suggesting patterns to search documents for information of interest, according to aspects of the present disclosure, is illustrated. Process 1000 may be implemented, for example, through the execution of one or more program modules (that are configured to function as a pattern suggestion engine) by one or more processors 204 of data processing system 200.

Process 1000 may, for example, be initiated in block 1002 in response to receipt of a user request to initiate pattern suggestion by data processing system 200. It should be appreciated that a user may initiate pattern suggestion to search for information in virtually any area (e.g., healthcare, banking, geography, information technology, etc.). Next, in block 1004, data processing system 200 acquires a working set of spans for a document set that includes one or more documents. As previously mentioned, one straightforward way to acquire an initial working set of spans is to execute one or more text extractors against a set of one or more documents to produce the set of spans.

Then, in block 1006, data processing system 200 generates a list of one or more suggested patterns by applying a pattern suggestion algorithm (PSA) to the set of spans for each document in the document set. Next, control transfers from block 1006 to block 1008, where data processing system 200 generates one or more unique patterns by applying a pattern consolidation algorithm (PCA) to the generated list of suggested patterns.

Then, in block 1010, data processing system 200 generates pattern information (e.g., occurrence information) for each of the unique patterns. In one or more embodiments, the pattern information includes a respective first count that corresponds to the number of times each of the unique patterns occurs in the document set and a respective second count that corresponds to the number of documents in the document set that include each of the unique patterns. In various embodiments, a user may select one or more of the suggested patterns and apply the selected suggested patterns to the set of documents. Based on the user selection, generation and ranking of the suggested patterns may be modified. For example, a user may delete a suggested pattern and the deleted suggested pattern may then be prevented from being displayed again or moved to a lower ranking in a list of possible suggested patterns. Ranking of suggested patterns may be based on different metrics and the total number of occurrences of a pattern is just one of the possible metrics that may be employed. As one example, if a particular pattern in the suggested patterns is more similar to a pattern selected by the user a ranking of the particular pattern may be increased. As another example, the uniqueness of a pattern may be utilized in pattern ranking In various embodiments, a user may select one or more suggested patterns and modify the selected patterns to create new patterns. In one or more embodiments, a user selection may be used as input to influence the generation of additional patterns for a next iteration. From block 1010 control transfers to block 1012 where process 1000 terminates until a user initiates a new pattern suggestion session.

Accordingly, techniques have been disclosed herein that advantageously suggest patterns for retrieving data of interest from unstructured documents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product for suggesting patterns, the computer program product comprising:
   a computer-readable storage device; and
   computer-readable program code embodied on the computer-readable storage device, wherein the computer-readable program code, when executed by a pattern suggestion system that includes a processor and memory coupled to the processor, causes the pattern suggestion system to:
   acquire a working set of spans from a document set that includes multiple documents, wherein a span in the working set of spans is defined by a pair of integers that represent character positions in an analyzed one of the documents and the integers of a particular span define a beginning and an end of a text segment;
   generate a list of suggested patterns by applying a pattern suggestion algorithm (PSA) to the set of spans for each document in the document set;
   generate one or more unique patterns by applying a pattern consolidation algorithm (PCA) to the suggested patterns that consolidates compatible ones of the suggested patterns; and
   generate pattern information for each of the unique patterns that is used by the pattern suggestion system to improve identification of relevant ones of the unique patterns by the pattern suggestion system, wherein the pattern information includes a respective first count that corresponds to the number of times each of the unique patterns occurs in the document set.

2. The computer program product of claim 1, wherein each suggested pattern in the list of suggested patterns includes an ordered sequence of extractors with appropriate pattern objects.

3. The computer program product of claim 2, wherein the pattern objects include token gaps and literals.

4. The computer program product of claim 1, wherein the working set of spans is acquired by executing one or more text extractors on each of the documents, and wherein each span in the set of spans maps to a single document and a single extractor.

5. The computer program product of claim 1, wherein the documents are unstructured documents.

6. The computer program product of claim 1, wherein the pattern information also includes a respective second count that corresponds to the number of documents in the document set that include each of the unique patterns and a pattern uniqueness.

7. The computer program product of claim 1, wherein the PSA is configured to determine a beginning of each of the suggested patterns, determine an end of each of the suggested patterns, determine a minimum and/or maximum length of each of the suggested patterns, ignore spans from a particular document and/or particular extractor, and reject particular patterns.

8. The computer program product of claim 1, wherein the computer-readable program code, when executed by the data processing system, further causes the data processing system to: selectively add pattern objects to the suggested patterns based on span begin and end positions.

9. A pattern generation system, comprising:
   a cache memory; and
   a processor coupled to the cache memory, wherein the processor is configured to:
   acquire a working set of spans from a document set that includes multiple documents, wherein a span in the working set of spans is defined by a pair of integers that represent character positions in an analyzed one of the documents and the integers of a particular span define a beginning and an end of a text segment;
   generate a list of suggested patterns by applying a pattern suggestion algorithm (PSA) to the set of spans for each document in the document set;
   generate one or more unique patterns by applying a pattern consolidation algorithm (PCA) to the suggested patterns that consolidates compatible ones of the suggested patterns; and
   generate pattern information for each of the unique patterns that is used by the pattern suggestion system to improve identification of relevant ones of the unique patterns by the pattern generation system, wherein the pattern information includes a pattern uniqueness.

10. The data processing system of claim 9, wherein each suggested pattern in the list of suggested patterns includes an ordered sequence of extractors with appropriate pattern objects, and wherein the pattern objects include token gaps and literals.

11. The data processing system of claim 9, wherein the working set of spans is acquired by executing one or more text extractors on each of the documents, and wherein each span in the set of spans maps to a single document and a single extractor and the documents are unstructured documents.

12. The data processing system of claim 9, wherein the pattern information also includes a respective first count that corresponds to the number of times each of the unique patterns occurs in the document set and a respective second count that corresponds to the number of documents in the document set that include each of the unique patterns, and wherein the PSA is configured to determine a beginning of each of the suggested patterns, determine an end of each of the suggested patterns, determine a minimum and/or maximum length of each of the suggested patterns, ignore spans from a particular document and/or particular extractor, and reject particular patterns.

* * * * *